United States Patent [19]

Brun

[11] 4,369,488
[45] Jan. 18, 1983

[54] OPTICAL SYSTEM PERMITTING CONTROLLED SHIFTING OF THE BEAM PATTERN IN HEADLAMPS, ESPECIALLY FOR VEHICLES

[75] Inventor: Norbert Brun, Bobigny, France
[73] Assignee: Cibie Projecteurs, Bobigny, France
[21] Appl. No.: 191,500
[22] Filed: Sep. 29, 1980

[30] Foreign Application Priority Data

Oct. 2, 1979 [FR] France .................. 79 24508
Dec. 24, 1979 [FR] France .................. 79 3154

[51] Int. Cl.$^3$ ............................................ F21V 7/00
[52] U.S. Cl. ...................................... 362/268; 362/80;
362/83; 362/280; 362/281; 362/308; 362/309;
362/319; 362/328; 362/329; 362/330; 362/331;
362/335; 362/339
[58] Field of Search ............... 362/80, 83, 268, 280,
362/281, 307, 308, 309, 319, 330, 331, 328, 335,
329, 339

[56] References Cited

U.S. PATENT DOCUMENTS 3,522,424  8/1970  Fritsch ........................ 362/268
3,849,642  11/1974  Puyplat ....................... 362/268
3,999,056  12/1976  Faulhaber ................... 362/268
4,241,388  12/1980  Green ......................... 362/268

*Primary Examiner*—Stephen J. Lechert, Jr.
*Attorney, Agent, or Firm*—Alan N. Levine

[57] ABSTRACT

In a vehicle headlamp, a light deflecting system is provided which comprises two plate-like transparent deflecting elements. Each element has a series of parallel fibs, and the elements are movable one relative to the other at right angles to the length of the ribs. The profiles of the ribs are so chosen that, in a neutral position of the deflecting elements, each rib on one deflecting element faces a rib of complementary shape on the other deflecting element, so that the system imposes no net deflection on light rays passing through. To produce a deflection of these rays, the deflecting elements are shifted relative to the other, so that then, the deflection suffered by the light in passing through one deflecting element is not wholly cancelled by the deflection suffered in passing through the other deflecting element; by suitable choice of the profile of the ribs, the net deflection is the same for all the deflected rays.

9 Claims, 20 Drawing Figures

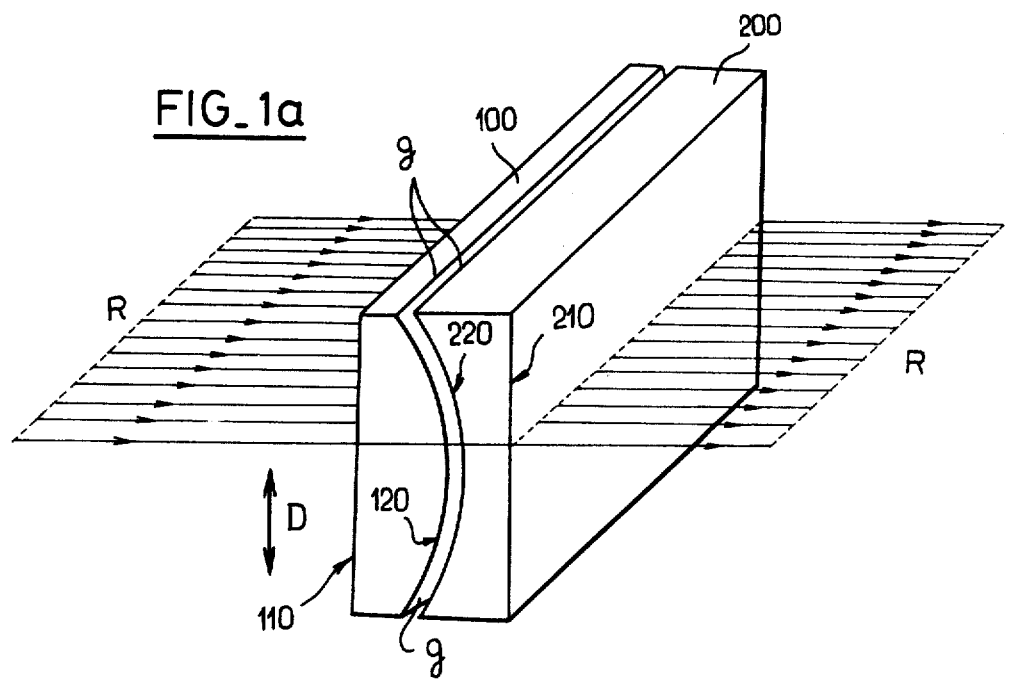
FIG_1a
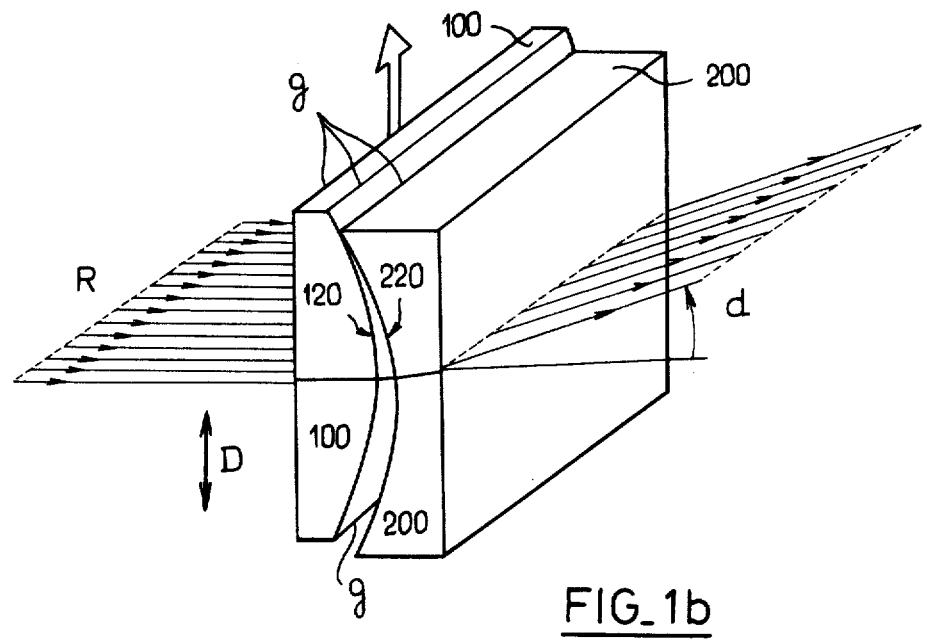
FIG_1b

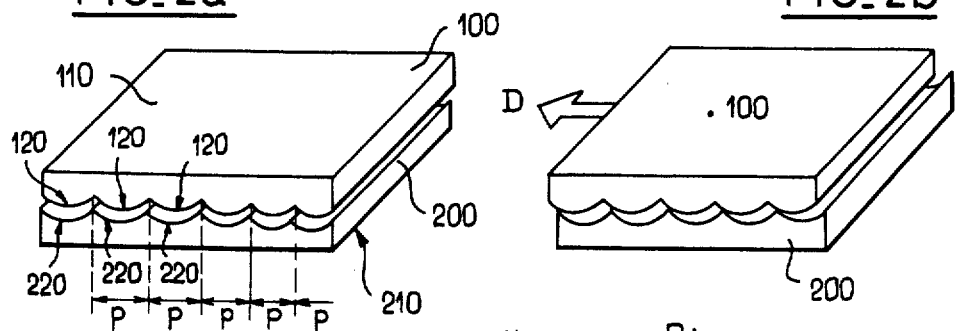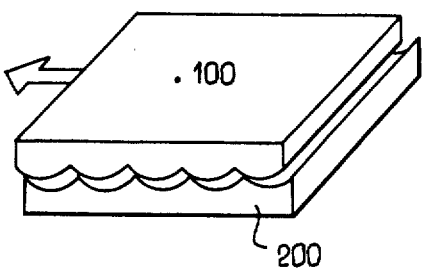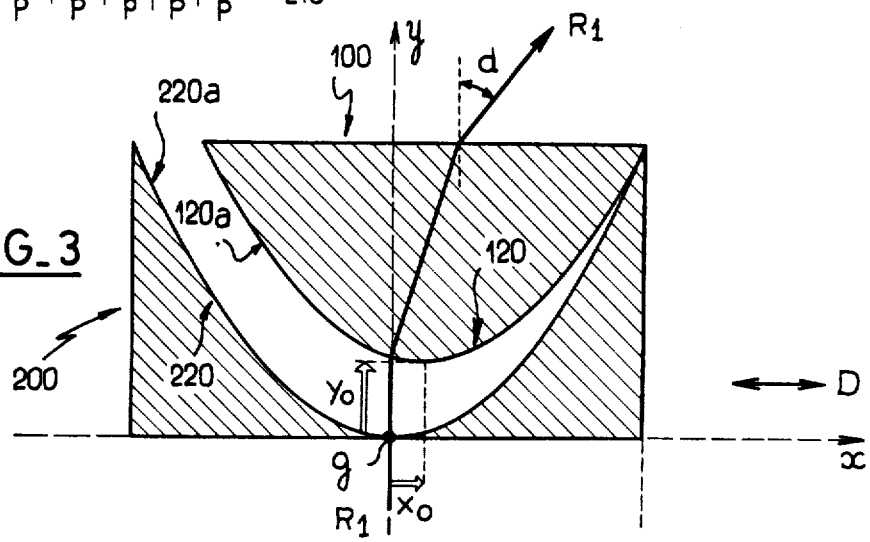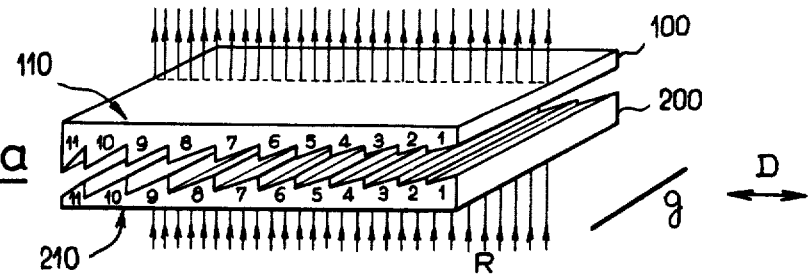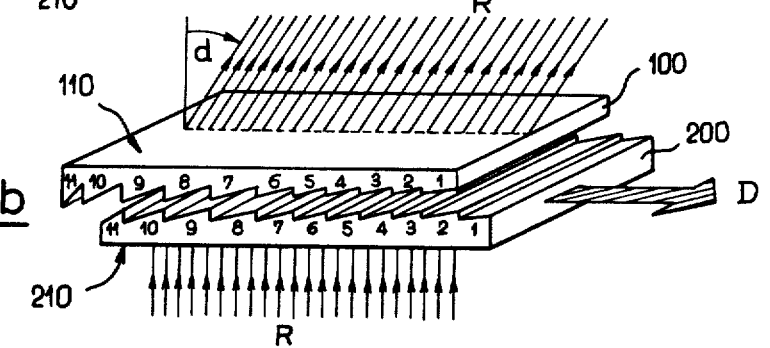

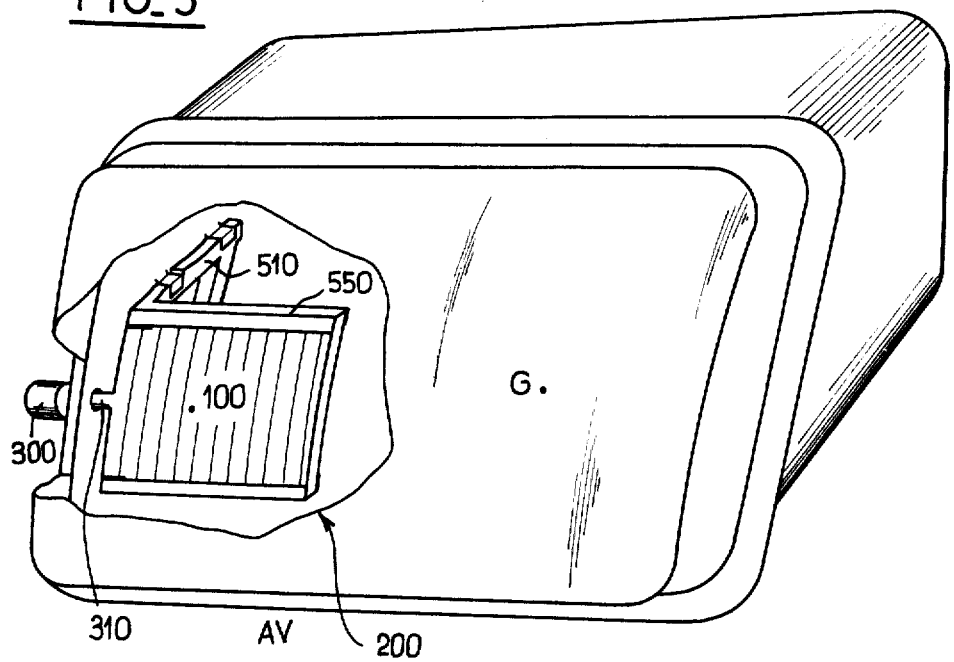
FIG_5
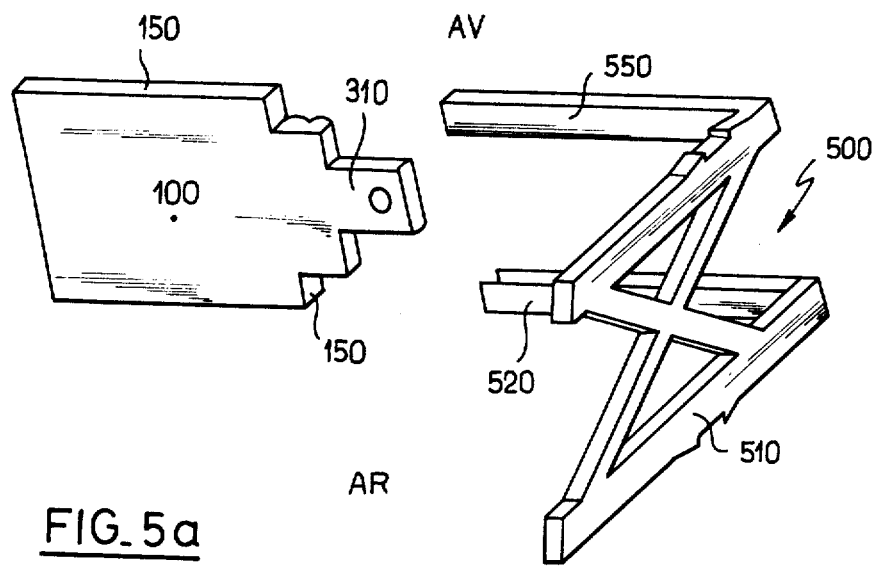
FIG_5a

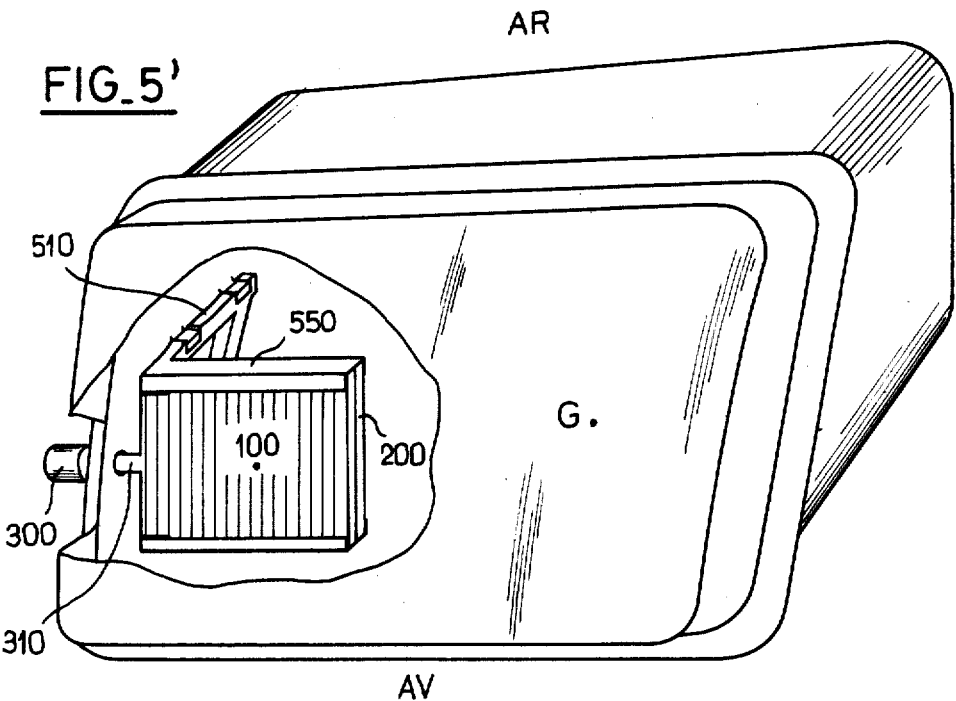
FIG.5'
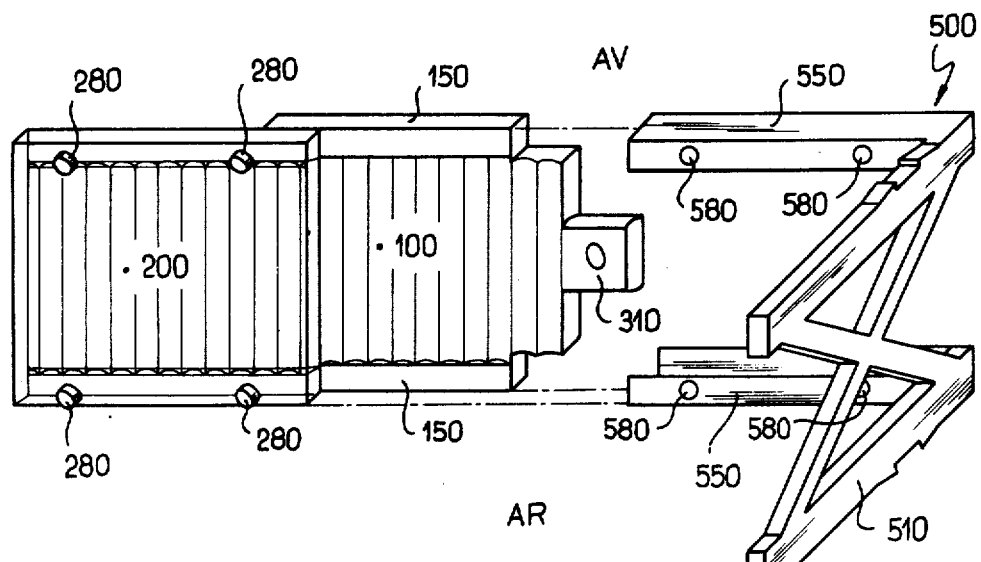
FIG.5'a

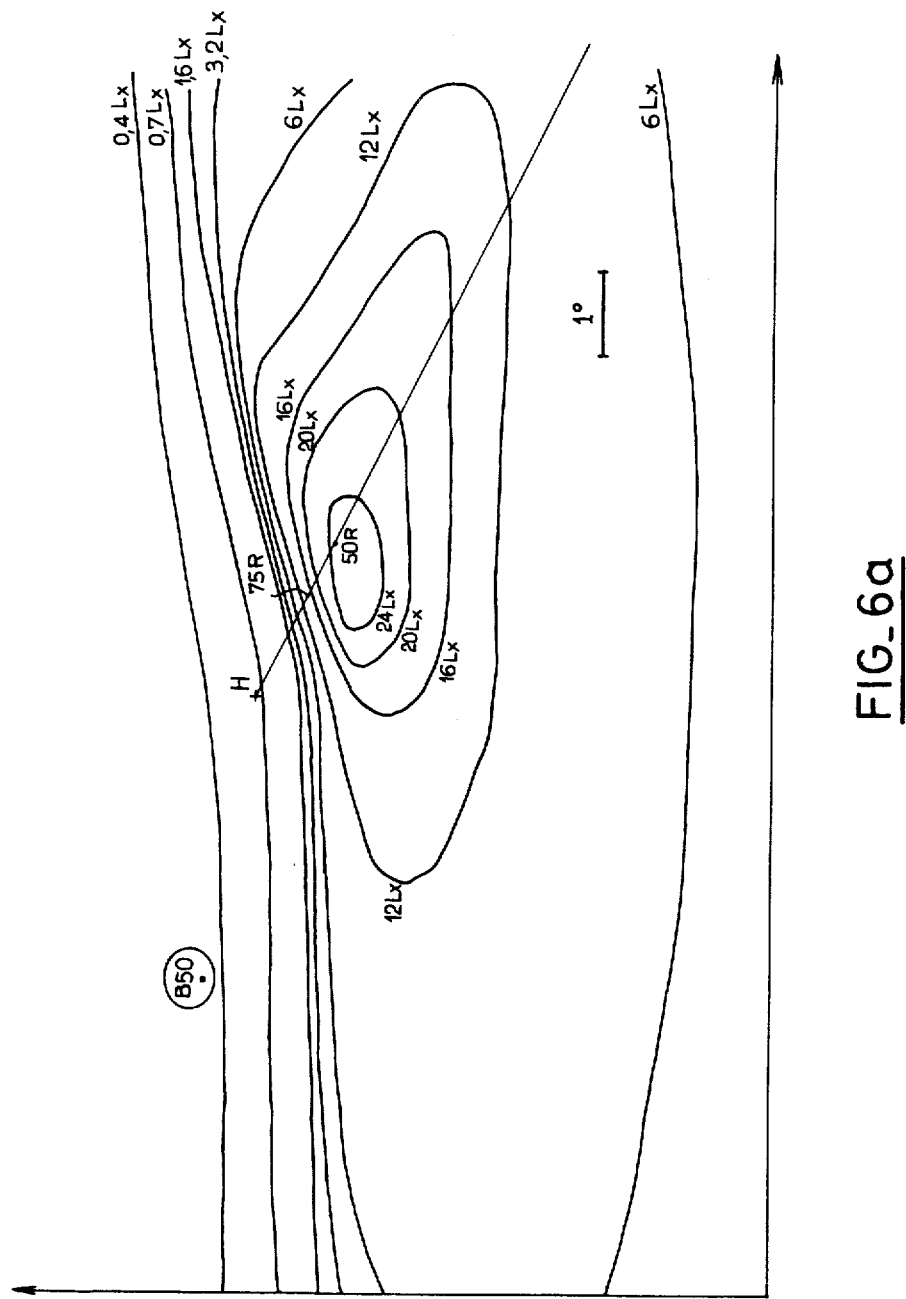
FIG_6a

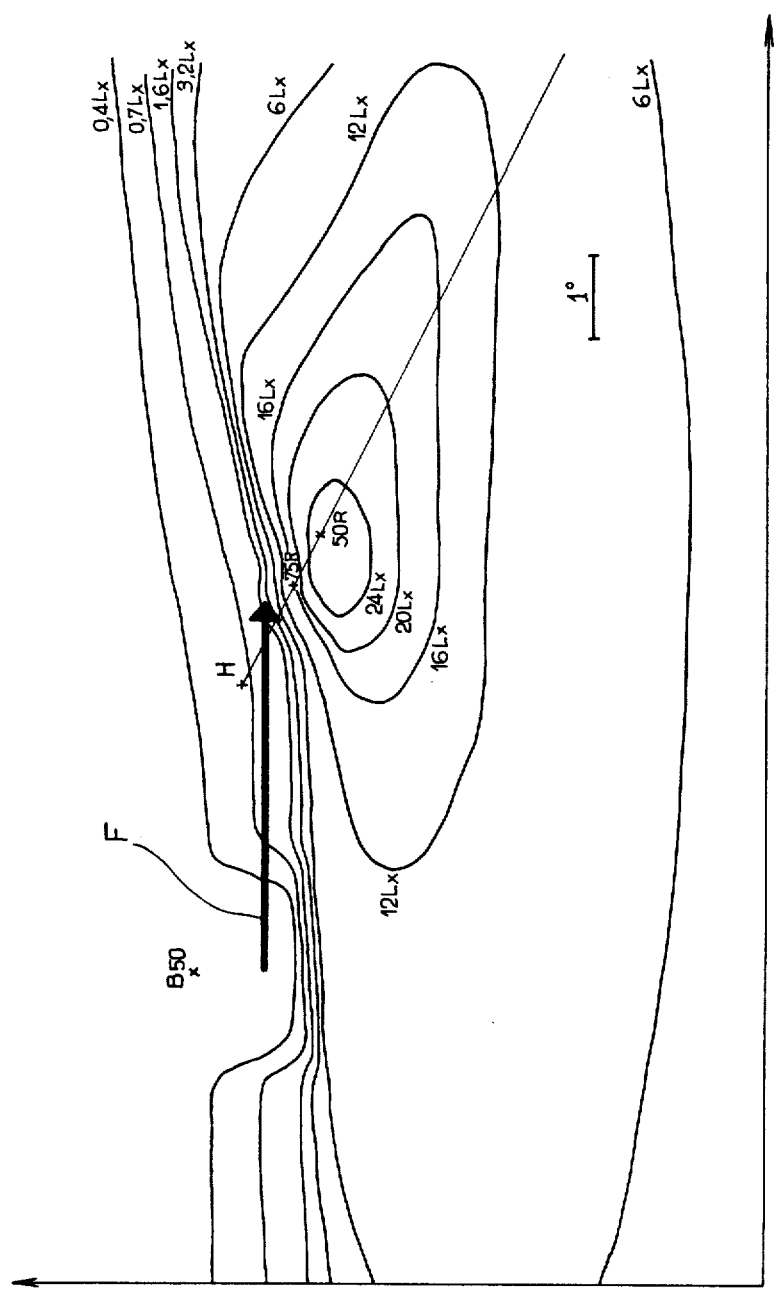
FIG_6b

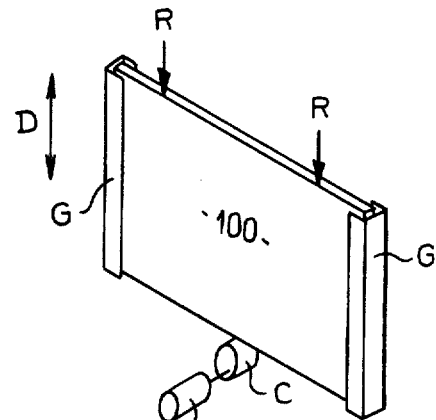
FIG_7
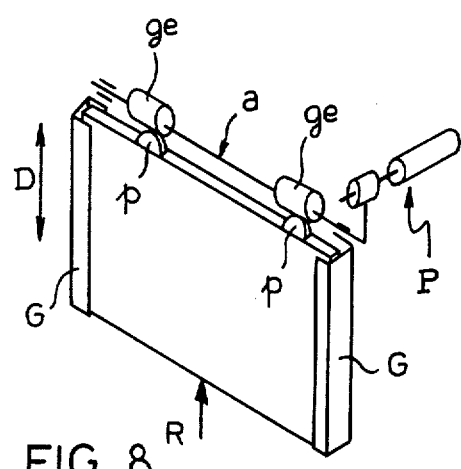
FIG_8
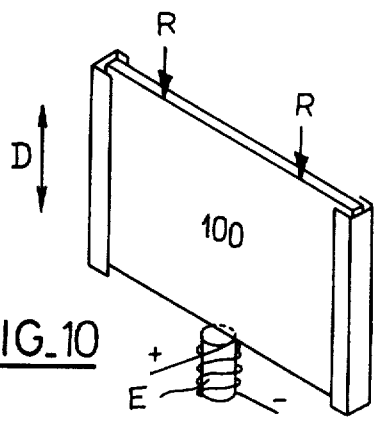
FIG_10
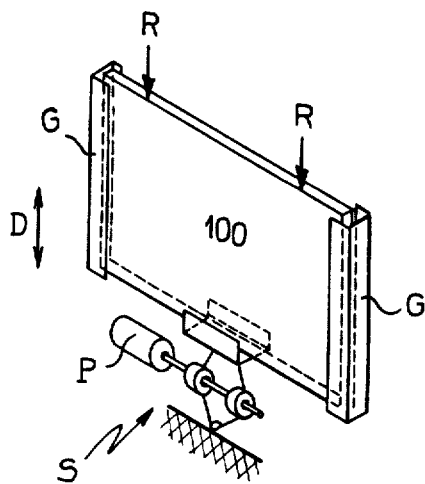
FIG_11
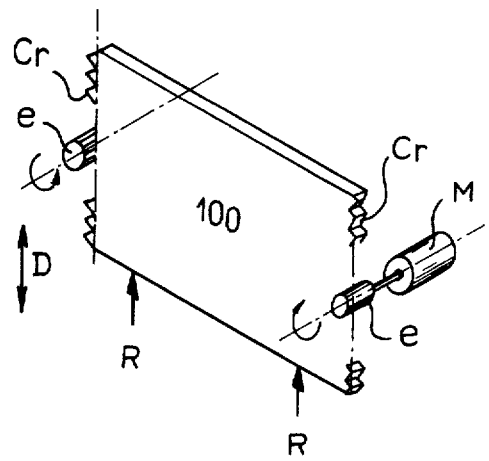
FIG_9

4,369,488

OPTICAL SYSTEM PERMITTING CONTROLLED SHIFTING OF THE BEAM PATTERN IN HEADLAMPS, ESPECIALLY FOR VEHICLES

FIELD OF THE INVENTION

This invention relates to optical systems which act on the beam produced by a headlamp, to deflect light rays contained in the beam into a different direction, when required. Such systems are particularly but not exclusively applicable to headlamps for automobiles; in such an application, it may for example be desired to modify the distribution of the light contained in a headlamp beam in order to produce an improved dipped-beam illumination pattern.

THE PRIOR ART

It has already been proposed to provide a headlamp with a beam deflecting system comprising one or more prisms which are movable from an inactive position in which they lie outside the path of the beam which is to be deflected, to an active position in which they intersect the beam. Such prisms are cumbersome, and systems embodying them are not very practical. In addition, they operate in a 'binary' manner, that is to say, the beam is either not deflected at all, or is deflected through a fixed angle determined by the design of the prisms, with no intermediate deflections being possible.

It has also been proposed, in French Pat. No. 1,034,703, to provide a headlamp with a beam adjusting system comprising two networks of lenses, arranged in face-to-face relationship. However, such systems have a severe disadvantage, in that they cause not only a change in the direction of the beam, but also a dispersion of the beam, which is undesirable.

The object of the present invention is to provide a deflecting system for a headlamp which allows a range of different deflections to be obtained, and which can rapidly be adjusted to vary the beam deflection, while not suffering from the disadvantages of the prior art.

SUMMARY OF THE INVENTION

According to one aspect, the present invention provides, in a headlamp having a light source, and a main optical system for forming light from the light source into a beam, a beam deflecting system comprising at least one generally plate-like transparent optical deflecting element, and means supporting the optical deflecting element in the path of light rays contained in the beam formed by the main optical system, with the optical deflecting element extending generally perpendicularly to such light rays, and the supporting means permitting a generally translational adjustment of the position of the optical deflecting element in a direction generally transverse to the beam formed by the main optical system, the said optical deflecting element bearing surface configurations of such shapes that those light rays of the beam which are incident on the beam deflecting system in a given direction emerge from the beam deflecting system in substantially the same direction as one another, and the said direction of emergence is changed by the translational adjustment of the optical deflecting element.

In one embodiment, the beam deflecting system includes a second generally plate-like transparent optical deflecting element mounted in generally face-to-face relationship with the first-mentioned optical deflecting element, each of the said optical deflecting elements having a series of parallel ribs, of a constant, predetermined pitch. In a preferred form of this embodiment, the ribs of the first-mentioned optical deflecting element are parallel to and of the same pitch as the ribs of the second optical deflecting element, and the ribs of the first-mentioned optical deflecting element have a predetermined curvilinear cross-section, while the ribs of the second optical deflecting element have a curvilinear cross-section substantially complementary to the said predetermined cross-section, and the various ribs extend generally at right angles to the direction of relative movement occurring between the first-mentioned and second optical deflecting elements as a result of the said translational adjustment of the first-mentioned optical deflecting element, whereby a progressive translational adjustment of the first-mentioned optical deflecting element results in a progressive shift of the direction of the light rays emerging from the beam deflecting system. In a so-called neutral position of the optical elements, the adjacent surfaces of the two sets of ribs lie parallel to one another, so that the rays passing through them are substantially undeflected. As the optical elements move relative to one another, away from the neutral position, the surfaces of the ribs shift further and further from parallelism, so that an increasing deflection is imparted to the rays passing through the deflecting system.

As will become clear, the ribs may have a curvilinear cross-section, in accordance with a logarithmic function, in order that all the rays deflected should be deflected through the same angle.

In a second preferred form of the invention, the ribs of the first-mentioned optical deflecting element are parallel to and of the same pitch as the ribs of the second optical deflecting element, and the ribs are all formed as triangular prisms, the angle of such prisms varying from one rib to the next within each of the said series of ribs, whereby a translational adjustment of the first-mentioned optical deflecting element by a multiple of the pitch of the ribs produces a shift in the direction of the light rays emerging from the beam deflecting system.

In either embodiment, the ribs may be formed either on the facing surfaces or on the opposite surfaces of the optical deflecting elements. Preferably, the deflecting elements are formed as planar elements, with smooth surfaces on the side away from the other optical element of the system, and with the ribs formed on their facing surfaces. This allows the ribs to be positioned as close together as possible, so that the effect of the spacing between the ribs on the optical behaviour of the system is as small as possible.

The optical deflecting elements may be made of any suitable optical material, such as glass or plastics, provided that the refractive index of the material is sufficiently high, for example in the neighbourhood of 1.5.

To allow the relative movement of the deflecting elements, suitable slideways may be provided. The movement may be produced by, for example, mechanical, hydraulic, or electrical means. An electro-magnetic actuator provides a particularly rapid adjustment of the headlamp beam.

The optical deflecting elements may be mounted between the reflector and the front lens of the headlamp. Alternatively, the front lens of the headlamp may actually form part of the beam deflecting system.

In a particularly preferred form, the beam deflecting system is used to improve the characteristics of the dipped beam of a headlamp, by shifting to the right, while passing an oncoming vehicle, that part of the beam which is normally directed towards the B50 reference point.

It will be appreciated that the deflecting effect of a deflecting system according to the invention is achieved without shifting any parts of the headlamp apart from the first-mentioned optical deflecting element, so that the main parts of the headlamp may, at least in some cases, be fixedly mounted on the bodywork of a vehicle.

BRIEF DESCRIPTION OF THE DRAWINGS

FIGS. 1a and 1b are diagrammatic view of an elemental beam deflecting system embodying the present invention, for a headlamp, FIG. 1a showing the system in a neutral position, and FIG. 1b showing the system in a beam-deflecting position;

FIGS. 2a and 2b are diagrammatic views, similar to FIGS. 1a and 1b, showing a deflecting system embodying the present invention, which in effect comprises a plurality of the systems shown in FIGS. 1a and 1b;

FIG. 3 is a diagrammatic view illustrating the cross-section of the ribs formed on the optical elements used in the deflecting systems of FIGS. 1a to 2b;

FIGS. 4a and 4b are diagrammatic views showing a different form of beam deflecting system embodying the invention, for a headlamp, with FIG. 4a showing the system in a neutral position, and FIG. 4b showing the system in a beam-deflecting position;

FIGS. 5, 5a, 5' and 5'a illustrate two forms of headlamp each embodying a deflecting system such as is shown in FIGS. 2a and 2b or FIGS. 4a and 4b;

FIGS. 6a and 6b show the illumination patterns produced by a headlamp such as that of FIG. 5 or FIG. 5', with FIG. 6a showing the pattern produced when the deflecting system is in a neutral position, and FIG. 6b showing the pattern produced when the deflecting system is in a beam-deflecting position; and FIGS. 7 to 11 illustrate diagrammatically various forms of actuating means which may be used to control a beam-deflecting system embodying the present invention.

DETAILED DESCRIPTION OF THE PREFERRED EMBODIMENTS

Firstly, the principle of operation of a beam deflecting system embodying the invention will be explained, with reference to FIGS. 1a and 1b, which illustrate an elemental deflecting arrangement, from a plurality of which a larger beam deflecting system may be built up.

The elemental deflecting arrangement comprises two transparent elements 100 and 200, arranged face to face in the path of light rays R, so that the light rays pass first through the element 100 and then through the element 200. The element 100 has its surface adjacent to the element 200 formed as a convex cylindrical rib, as indicated at 120; the adjacent surface of the element 200 is formed as a concave cylindrical surface or flute, as shown at 220, whose profile is the complement of the profile of the rib 120. The remaining surfaces of the elements 100 and 200 through which the rays R pass are shown at 110 and 210, and are plane and parallel to one another. The elements 100 and 200 are displaceable, one relative to the other, in the direction indicated by an arrow D, perpendicular to the generatrices of the cylindrical surfaces 120 and 220, which are shown at g, and parallel to the plane surfaces 110 and 210. The amplitude of the relative movement is less than half the extent of the elemental cylindrical surfaces 120 and 220 in the direction of the arrow D.

FIG. 1a shows the elements 100 and 200 in such a relative position that the cylindrical surfaces 120 and 220 lie parallel to one another; this is referred to as the 'neutral' position. It can easily be seen that, with the elements in this position, the rays R pass through the deflecting arrangement without being appreciably deflected; if a ray should suffer a deflection as a result of passing through the element 100, it immediately afterwards suffers a substantially equal deflection in the opposite sense in passing through the complementary part of the element 200.

If, on the other hand, the elements 100 and 200 are shifted away from the neutral position, then, as shown in FIG. 1b, the light rays R suffer a deflection d, in the plane perpendicular to the generatrices g of the cylindrical surfaces 120 and 220.

It has been discovered that it is possible to choose the profile of the cylindrical surfaces 120 and 220 (that is to say, the shape of the directrices of these surfaces) in such a way that the deviation d is the same for all rays, such as R, passing through the elemental deflecting arrangement, for a given relative displacement of the elements 100 and 200 in the direction D from the neutral position.

In practice, as shown in FIGS. 2a and 2b, which are analogous, respectively, to FIGS. 1a and 1b, a beam deflecting system would comprise two elements 100 and 200, which have, on their facing surfaces, ribs 120 or flutes 220, respectively, each corresponding to the single rib 120 or flute 220 of FIGS. 1a and 1b; these ribs or flutes are regularly spaced with a pitch p. As FIGS. 2a and 2b show, the surfaces 110 and 210 of the elements 100 and 200 which face away from the ribs or flutes are plane, without any interruptions corresponding to the discontinuities between adjacent ribs or adjacent flutes.

The deflecting system of FIGS. 2a and 2b is in effect a combination of a number of elemental deflecting arrangements of the type shown in FIGS. 1a and 1b, but the discontinuities between the adjacent elements of the deflecting system do not modify the deflecting effects of these individual elements. Thus, the deflecting effect of the system shown in FIGS. 2a and 2b is just the same as that of the elemental deflecting arrangement shown in FIGS. 1a and 1b. The maximum relative movement of the optical elements 100 and 200 of FIGS. 2a and 2b is always less than half the pitch p.

FIG. 3 is a diagrammatic section taken through a rib 120 on one deflecting element 100 and a flute 220 on a complementary deflecting element 200, the section being taken on a plane at right angles to the generatrices of these surfaces. In this figure, the x-axis is arranged in the direction of the relative displacement D, while the y-axis is arranged along the median line of the flute 220 (and also along the median line of the rib 120, when the two elements are in their neutral position). In the illustrated position, the rib 120 is shifted to obtain a deflection d for a ray R, incident parallel to the y-axis.

It has been shown by theoretical calculations, confirmed by experience, that the complementary profiles 120a and 220a of the rib 120 and the flute 220 may be so chosen that the same deflection d is suffered by any incident ray parallel to the y-axis. These profiles may be defined in terms of the x and y co-ordinates, and will depend on the required deflection d, the refractive index $\mu$ of the optical elements 100 and 200, and the relative displacement $x_o$ of the two optical elements.

The optimum curve is defined by the equation:

$$y(x) = \frac{1}{k} \log_e\left(\frac{1}{\cos kx}\right) \text{ where } k = \frac{d}{(\mu - 1)x_o} \quad (1)$$

It can be shown that, with this curve, the tangents to the two surfaces 120 and 220 at any two points which lie on the respective surfaces 120 and 220, at the same x-coordinate, lie at the same angle to one another, irrespective of the value of the x-coordinate.

For small deflections d, that is to say, less than 10° and preferably less than 5°, it is satisfactory for the profiles 120a and 220a to be defined by a parabolic function, as follows:

$$y(x) = \frac{x^2}{2P} \text{ where } P = \frac{(\mu - 1)x_o}{d} \quad (2)$$

FIGS. 4a and 4b illustrate the principle of operation of a second form of beam deflecting system embodying the invention. In this system, two transparent optical elements 100 and 200 are again used, which have on their facing surfaces a pattern of parallel ribs with a constant pitch p, but in this case, the optical elements are displaced relative to one another, when a deflection is required, by an integral multiple of the pitch p. In the drawings, the ribs are numbered 1, 2, 3, 4, ... etc; each rib is of saw-tooth profile, with the sloping part of the profile forming a facet lying at an angle to the plane surface 110 or 210 which increases steadily from rib 1 to the higher-numbered ribs.

In the neutral position, shown in FIG. 4a, facets of the same number face one another, and lie parallel to one another. Thus, the system imposes substantially no deflection on rays incident perpendicular to the surfaces 110 and 210.

FIG. 4b shows the position after a relative displacement D of the two optical elements 100 and 200 has taken place, which displacement is an integral multiple of the pitch p; in the illustrated position, the displacement D is equal to the pitch p. In this position, the facet 1 of one of the optical elements faces the facet 2 of the other, and so on. Because of the increase in inclination from a facet of a lower number to a facet of a higher number, there is, between each pair of facing facets, an air gap bounded by facets which lie at an angle to one another; in the preferred embodiment, the angle between the facets is the same for each facing pair of facets. Thus, any one of the incident rays R will suffer a deflection d which is the same for all the rays R, from one end of the system to the other.

In the foregoing explanations, it has been assumed that the air gap which separates the two optical elements 100, 200, especially in the neutral position, is of so small a thickness as not to affect the calculations of the profiles of the surfaces 120 and 220. However, the thickness of the air gap may be taken into account when making an absolutely rigorous calculation of the required shapes of the optical elements.

FIG. 5 is a front perspective view of an automobile vehicle headlamp embodying the invention. The headlamp has a front lens G, which incorporates at its right-hand side (that is, the right-hand side for a person facing in the direction of travel of the vehicle) a zone 200 (broken away in FIG. 5, for clarity) constituting one of the two optical elements of a beam deflecting system. The beam deflecting system may operate according to the principles previously explained. The second optical element of the beam deflecting system is shown at 100, and is mounted, with its ribs extending vertically, behind and parallel to the front lens G, in such a way that the element 100 may be moved translationally, in the lateral direction, parallel to the front lens G. Actuating means 300 are provided, connected to the optical element 100 by a linkage 310, to produce this translational movement of the element 100. This actuating means may be under either manual or automatic control.

FIG. 5a is an exploded perspective view of certain parts of the deflecting system, taken from the rear. These parts comprise a frame 500, fixed by a cruciform structure 510 to the inside of a side wall of the headlamp, and provided with two slideways 550, in which the edges 150 of the optical element are guided for lateral sliding.

FIGS. 5' and 5'a are views, similar to FIGS. 5 and 5a, of a slightly different form of vehicle headlamp; parts which correspond to parts shown in FIGS. 5 and 5a will be referred to by the same numerals. The headlamp of FIGS. 5' and 5'a differs from that of FIGS. 5 and 5a in that it incorporates a deflecting system comprising two optical elements 100 and 200, neither of which is formed as part of the headlamp lens G; the element 100 is mounted in slideways 550, in much the same way as in FIG. 5a while the element 200 is mounted behind the element 100 by being rigidly attached to the slideways, by means of complementary fixing elements 280 and 580 formed on the element 200 and on the slideways 550.

FIGS. 6a and 6b illustrate the effect of a deflecting system in such a headlamp. These figures show the isolux curves (obtained by calculation) of the beam pattern which would be obtained by projecting the headlamp beam on to a screen, in the conventional testing method. The point H is the point of intersection between the screen and the optical axis of the headlamp, while the points B50, 75R and 50R are other standard points of reference on the screen. FIG. 6a shows the illumination pattern which is obtained with the deflecting system in its neutral position. If now the deflecting system is shifted to the position in which it produces the greatest deflection of that part of the headlamp beam which passes through it, the illumination pattern changes to that illustrated in FIG. 6b. It can be seen that a large part of the light which previously illuminated the area around the point B50 is now deflected to the right, as shown by the arrow F; this strengthens the illumination in the upper right-hand portion of the dipped beam, which is a very desirable result.

The actuating means for the movable element of the deflecting system may take any of a variety of forms. FIGS. 7 to 11 illustrate certain possible forms, by way of example. In these figures, corresponding parts are indicated by the same reference numerals. In each figure, an optical element 100, shown as rectangular in shape, is to be shifted vertically against the action of return springs R; the element 100 is preferably movable in guides, which are diagrammatically shown at G.

In the arrangement shown in FIG. 7, a motor or rotary actuator turns a cam C acting on the lower edge of the element 100.

In the arrangement of FIG. 8, a piston-and-cylinder actuator P rocks a shaft a having eccentric rollers or cams ge which cooperate with studs p fixed on the optical element 100.

In FIG. 9, a rotary motor M drives a pinion e which meshes with a rack Cr provided on the vertical edge of the element 100.

In the arrangement shown in FIG. 10, a solenoid E has a movable armature which bears directly on the lower edge of the element 100, to lift it against the action of the springs R.

In the arrangement of FIG. 11, a deformable linkage S, controlled by a piston-and-cylinder actuator P, produces the vertical movements of the optical element 100.

As mentioned previously, the actuating means for the deflecting system may be under manual or automatic control. One possible source of signals for automatic control of the deflecting system, in the case where the deflecting system controls the height of a headlamp beam of a road vehicle, is a light detector arranged to detect light from an oncoming vehicle.

It will be appreciated that the present invention provides a headlamp with a beam deflecting system which has certain advantages over those of the prior art. More specifically, the system allows adjustment of the beam in a continuous or nearly continuous manner, rather than providing merely a deflected and a nondeflected state of the beam. Also, the only element which has to be moved in operation of the beam deflecting system is a very light optical deflecting element, and this element has to be moved over only a small stroke. This may lead to substantial economies in materials, and in the energy required to operate the deflecting system. It should be realised, however, that lateral adjustment of a beam is not the only application of the invention; with a suitable arrangement of the ribs on the optical deflecting elements, and of the direction of relative movement of the optical elements, the invention may be used to deflect the beam in other directions, for example vertically.

I claim:

1. In a headlamp having a light source, and a main optical system for forming light from said light source into a beam, a beam deflecting system comprising at least one generally plate-like transparent optical deflecting element, and means supporting said optical deflecting element in the path of light rays contained in the beam formed by said main optical system, with said optical deflecting element extending generally perpendicularly to such light rays, and said supporting means permitting a generally translational adjustment of the position of said optical deflecting element in a direction generally transverse to the beam formed by the main optical system, the said optical deflecting element bearing surface configurations of such shapes that those light rays of the beam which are incident on the said beam deflecting system in a given direction emerge from the said beam deflecting system in substantially the same direction as one another, and the said direction of emergence is changed by the said translational adjustment of said optical deflecting element.

2. A headlamp according to claim 1, wherein said beam deflecting system includes a second generally plate-like transparent optical deflecting element mounted in generally face-to-face relationship with said first-mentioned optical deflecting element, each of the said optical deflecting elements having a series of parallel ribs, of a constant, predetermined pitch.

3. A headlamp according to claim 2, wherein said ribs of said first-mentioned optical deflecting element are parallel to and of the same pitch as said ribs of said second optical deflecting element, and said ribs of said first-mentioned optical deflecting element have a predetermined curvilinear cross-section, while said ribs of said second optical deflecting element have a curvilinear cross-section substantially complementary to the said predetermined cross-section, and the said ribs extend generally at right angles to the direction of relative movement occurring between said first-mentioned and second optical deflecting elements as a result of the said translational adjustment of said first-mentioned optical deflecting element, whereby a progressive translational adjustment of said first-mentioned optical deflecting element results in a progressive shift of the direction of the light rays emerging from the said beam deflecting system.

4. A headlamp according to claim 3, wherein the said ribs have a logarithmic curvilinear cross-section, in accordance with the equation:

$$y(x) = \frac{1}{k} \log_e \left( \frac{1}{\cos kx} \right) \text{ where } k = \frac{d}{(\mu - 1)x_o}.$$

5. A headlamp according to claim 3, wherein the said ribs have a parabolic curvilinear cross-section, in accordance with the equation:

$$y(x) = \frac{x^2}{2P} \text{ where } P = \frac{(\mu - 1)x_o}{d}.$$

6. A headlamp according to any one of claims 1 or 5, wherein said beam deflecting system includes an actuating device which produces said translational adjustment, in the form of a substantially continuous adjustment.

7. A headlamp according to claim 2, wherein said ribs of said first-mentioned optical deflecting element are parallel to and of the same pitch as said ribs of said second optical deflecting element, and said ribs are all formed as triangular prisms, the angle of such prisms varying from one rib to the next within each of the said series of ribs, whereby a translational adjustment of said first-mentioned optical deflecting element by a multiple of the said pitch of said ribs produces a shift in the direction of the light rays emerging from the said beam deflecting system.

8. A headlamp according to claim 7, wherein said beam deflecting system includes an actuating device which produces said translational adjustment, with a magnitude which is a multiple of the said pitch of said ribs.

9. A headlamp according to claim 1, wherein said beam deflecting system includes a second optical deflecting element mounted in generally face-to-face relationship with said first-mentioned optical deflecting element, each of the said optical deflecting elements being formed as a Fresnel lens.

* * * * *